United States Patent Office 2,843,549
Patented July 15, 1958

2,843,549

ANTI-SEEP AGENT

William H. Harwood and Warren W. Woods, Ponca City, Okla., assignors to Continental Oil Company, Ponca City, Okla., a corporation of Delaware No Drawing. Application August 12, 1954
Serial No. 449,524

8 Claims. (Cl. 252—72)

This invention is concerned with preventing or retarding the seepage of liquids through pinholes and other small openings by the addition thereto of a minor amount of anti-seep agent, and it relates more particularly to preventing or retarding the seepage of antifreeze and similar compositions containing water used in automotive cooling systems.

There is a marked tendency of certain liquids such as antifreeze liquid of the ethylene glycol type, etc., when mixed with water to escape by seepage through minute openings in the coolant system. This phenomenon apparently results from improved wetting of the walls of these pinholes, capillaries, etc., by the addition of the ethylene glycol. Such wetting permits penetration of liquid into the pinhole and its subsequent escape from the radiator system. Various methods have been proposed to inhibit seepage of such liquids; but none have been entirely satisfactory. In one proposal a water insoluble oily material was added to the antifreeze which presumably clogs these pinholes and thus reduce the loss of the antifreeze proper. Such compositions, however, have a tendency to separate badly both in storage and in use. In addition, the second phase of these compositions has not been particularly effective in sealing off the leaking pinholes.

It is, therefore, an object of the present invention to provide a composition which obviates the disadvantages of the prior art compositions. It is another object of our invention to provide an inhibitor which will significantly reduce the seepage of such liquids through small openings. These and other objects and advantages will become apparent as the invention is more thoroughly described.

These objectives are obtained by a process which, in brief, comprises adding to a liquid susceptible of seepage a minor amount of an anti-seep agent comprising a water insoluble hydrocarbon, an organic silicon compound which is soluble in the hydrocarbon and insoluble in water, and a surface active agent which has the ability to disperse the hydrocarbon-silicon polymer phase in the liquid susceptible of seepage.

It has been found that the co-addition of the organic silicon compounds and emulsifying agents greatly increases the efficacy of the dispersed phase in retarding leakage. Furthermore, the use of an emulsifying agent decreases separation difficulties in storage and in use.

The silicon compounds found to be useful in this invention are liquid monomeric and polymeric organic silicon compounds such as, for example, hydrocarbon silicates, silanes, and siloxanes which contain hydrocarbon or other organic radicals. The polysiloxanes, more commonly known in the trade as silicone oils, are especially suitable and are available commercially in a considerable number of types and degrees of polymerization. Their general structure may be expressed by the formula:

(1)
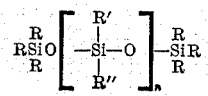

wherein $n$ is a positive integer or even zero, R, R' and R" are alkyl or aryl radicals.

Specific examples of suitable silicone oils include polyethyl siloxanes, polymethyl siloxanes, and polymethyl phenyl siloxanes.

It is not necessary that the R, R' and R" groups in Formula 1 be attached to the silicon atoms by C-Si bonds. Linkage may be through an oxygen to silicon bond as in the case of the silicate esters, also known as alkoxy polysiloxanes. Specific examples found suitable in this invention are hexa(2 ethyl butoxy) disiloxane and hexa(2 ethyl hexoxy) disiloxane.

Suitable surface active agents are oil-in-water emulsifiers. By preference, they should not foam excessively in the water phase and should not form insoluble deposits in the presence of hard water. Several types of non-ionic emulsifiers have such properties including the following:

(a) Condensation products of alkyl phenols or alcohols and ethylene oxide or polyglycols.
(b) Block co-polymers of hydrophilic and lyophilic monomers (e. g., ethylene oxide and propylene oxide).
(c) Alkanolamides of fatty acids.
(d) Condensation products of fatty acids with ethylene oxide or polyglycols.
(e) Complex esters and ester-ethers (e. g., esters of sorbitan, ethylene oxide condensation products with such sorbitan esters).

The hydrocarbon used must be a solvent for the organic silicon polymer and it should have a boiling point sufficiently high to prevent excessive evaporation in use. A wide variety of petroleum distillates are suitable. Two which have been used are known as burner distillate and light cycle oil. Their properties are as follows:

| | Burner Distillate | Light Cycle Oil |
|---|---|---|
| Gravity, A. P. I. | 19–27 | 30 |
| A. S. T. M. distillation, ° F.: | | |
| I. B. P. | 380 | 408 |
| 10% recovered | 460 | 430 |
| 50% recovered | 500 | 450 |
| 90% recovered | 600 | 475 |
| E. P. recovered | 630 | 525 |
| Aniline No., ° F. | 52 | 88 |

The quantities of the anti-seep agent incorporated in the liquid susceptible of seepage may be varied to a considerable extent. If, however, it is incorporated in an antifreeze composition, the maximum amount of the anti-seep agent is limited in general by statutory requirements. By statute, antifreeze compositions, and specifically those of the so-called permanent type, must contain a minimum percentage of the antifreeze agent. The remainder of the antifreeze compositions will contain anti-seep agent, anti-corrosion agent, and other additives. As a general rule the amount of additives permissible in an antifreeze composition is limited to about a maximum of 3 percent. As a consequence, the amount of anti-seep agent must be less than 3 percent. We have found that entirely satisfactory results are obtained when about 1 percent of the anti-seep agent is used in the antifreeze composition.

We have found that the anti-seep agent may be made up containing a hydrocarbon, an organic silicon compound, and the non-ionic surface active or emulsifying agent in the following ratios: The surface active agent 0.1 to 2.0 percent as a suitable range with about 0.25 percent preferred. The organic silicon compound 0.1 to upwards of 3.0 percent suitable with about 0.5 percent preferred and sufficient hydrocarbon to make up 100 percent. The exact quantities of the different components used is governed largely by economics. As a general rule the surface active agent and the organic silicon compound are expensive, particularly when compared to the hydrocarbon.

In order to disclose more clearly the nature of the present invention and the advantages thereof, reference will hereinafter be made to certain specific embodiments which illustrate the flexibility of the hereindescribed process. It should be clearly understood, however, that this is done solely by way of example and is not to be construed as a limitation upon the spirit and scope of the appended claims. Parts given are parts by weight.

| Example No. | Composition of Anti-creep used at 1% in Ethylene Glycol | | | Creepage of 40% Antifreeze solution in water [d] |
|---|---|---|---|---|
| | Percent Polysiloxane[a] | Percent Emulsifying Agent[b] | Percent Hydrocarbon[c] | |
| 1 | 10 | 1 | 89 | 2.35 |
| 2 | 5 | 1 | 94 | 2.17 |
| 3 | 2 | 1 | 97 | 2.22 |
| 4 | 1 | 0.5 | 98.5 | 1.54 |
| 5 | 0.5 | 0.25 | 99.25 | 2.42 |
| 6 | 0.25 | 0.25 | 99.50 | 2.73 |
| 7 | 2.0 | 0.5 | 97.5 | 3.35 |
| 8 | 2.0 | | 98.0 | 3.55 |
| 9 | | 1 | 99 | 3.26 |
| 10 | | | 100 | 4.25 |
| 11 | | | | 4.25 |

[a] Commercial methyl polysiloxane, 100 centistokes at 25° C.
[b] Commercial polyoxyethylene ester sold under trade name Sterox CD, from the Monsanto Chemical Company of St. Louis 4, Missouri. Its physical and chemical properties are as follows:

Composition_____ Polyoxyethylene ester.
Appearance_____ Pale yellow to light amber liquid.
Odor_____ Mild fatty odor.
Specific gravity at 25° C__ 1.060.
Viscosity Saybolt Furol seconds:
   At 70° F_____ 250.
   At 100° F_____ 100.
   At 210° F_____ 20.
Pour point_____ 50° F.
Flash point_____ 518° F.
Hygroscopicity_____ Slightly hygroscopic.

The foregoing data were obtained from technical bulletin No. P-129 which was published by the Monsanto Chemical Company on August 1, 1952. To identify this particular product further, it is a condensation product of tall oil with ethylene oxide.
[c] Burner distillate previously described.
[d] Centimeters rise in capillary tubes of 0.50 mm. internal diameter.

The data in the table given above show that:

(a) The use of hydrocarbon alone, that is without any emulsifying agent, has no effect in improving the anti-creep properties of the composition as shown by comparison of Examples 10 and 11.

(b) The inclusion of the silicon compound in the hydrocarbon while providing some improvement as shown by comparison of Examples 8 and 10, does not effect as much improvement as the inclusion of the emulsifying agent in the hydrocarbon as shown by Example 9. This demonstrates clearly that the emulsifying agent is a requisite, since the hydrocarbon when used either alone or as a carrier for the silicon compound apparently is not able to penetrate the capillary openings through which seepage takes place.

(c) When the silicon compound is present in a hydrocarbon which also has present the emulsifying agent so that the hydrocarbon may carry the silicon compound into the capillary openings, the maximum improvement is secured as shown by Examples 1 to 7.

(d) There is a significant concentration of the silicon material for maximum effect as shown by comparison of Example 4 with Examples 1 to 3 and 5 to 7. In selecting a particular composition for commercial usage consideration of economy as well as performance must be taken into account. The amount of improvement occurring from the use of 1 percent of the silicon material as shown by Example 4 as compared with the amount of improvement accruing from the use of ½ percent as shown by Example 5 is not sufficient to justify the additional cost, i. e., the virtual double of the cost of the anti-creep agent since the silicon compound being very expensive is practically the entire cost of the anti-creep agent.

(e) In the selection of particular concentrations of each component for best commercial performance, the amount of emulsifying agent present which tends to increase the foaming properties of the ultimate anti-freeze composition will influence to a certain extent the amount of silicon compound which must be used since, as the concentration of the emulsifying agent is increased and the foaming tendencies of the ultimate composition accordingly increased, the silicon compound must perform a dual function, that is, as a foam suppressant as well as an anti-creep agent.

It can be seen from this tabulation of data that the hydrocarbon itself is ineffective and further that the combination of polysiloxane, emulsifying agent, and hydrocarbon is peculiarly effective.

Behavior of current commercial two-phase antifreezes in this same creepage test is indicated below:

| Antifreeze | Creepage of 40% Antifreeze Solution in Water |
|---|---|
| No anti-creep | 4.25 |
| Competitive A | 4.19 |
| Competitive B | 3.63 |
| Competitive C | 3.22 |
| Competitive D | 2.44 |
| Example 5 | 2.42 |

In actual use tests, the antifreeze of Example 5 was introduced into the cooling system of 6 test cars each of which showed one to five persistent pinhole leaks when using conventional single phase antifreeze. Inspections over a period of 3 weeks after this change showed that 75 percent of these leaks were thus eliminated.

Similar results have been obtained with a variety of analogous compositions as indicated below. In all cases, testing was at 1 percent anti-creep in the antifreeze and a 40 percent antifreeze concentration in water.

| Example | Anti-Creep Composition | | | Creepage |
|---|---|---|---|---|
| | Silicon Compound | Emulsifying Agent | Hydrocarbon | |
| 12 | 2% hexa (2 ethyl hexoxy (disiloxane). | 1% polyoxyethylene ester. | 97% burner distillate. | 2.42 |
| 13 | 2% methyl phenylpolysiloxane. | ___do___ | ___do___ | 2.36 |
| 14 | 2% methyl polysiloxane. | 1% sorbitan monolaurate, polyoxyethylene sorbitan monolaurate mixture. | ___do___ | 2.46 |
| 15 | ___do___ | 1% glycerol monooleate. | light cycle oil. | 2.38 |

The silicon compound of Example 12 called hexa(2 ethyl hexoxy) disiloxane may also be called hexa (2-ethylhexyl) orthodisilcate.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. The method of imparting anti-seepage properties to an aqueous ethylene glycol composition which comprises incorporating in said aqueous composition an anti-seep agent, comprising on a weight basis 95 to 99.8 percent of a water insoluble petroleum hydrocarbon boiling within the range of 300 to 630° F.; a non-ionic emulsifying agent wherein said non-ionic emulsifying agent is an ester of a polyhydroxy alcohol with a higher fatty acid, .1 to 2.0 percent; and a liquid organic silicon compound, .1 to 3.0 percent of the general formula:

in which R, R', and R" represent alkyl, aryl, and alkoxy radicals and $n$ represents zero and positive integers and wherein said organic silicon compound is soluble in said petroleum hydrocarbon and insoluble in water in an amount corresponding from about 1 to 3 parts of said anti-seep agent per 100 parts of said aqueous composition.

2. The method of claim 1 wherein the silicon compound is hexa(2 ethyl hexoxy) disiloxane.

3. The method of claim 1 wherein the emulsifying agent is a mixture of sorbitan monolaurate and polyoxyethylene sorbitan monolaurate.

4. The method of claim 1 wherein the emulsifying agent is glycerol mono-oleate.

5. The method of imparting anti-seepage properties to an aqueous ethylene glycol composition which comprises incorporating in said aqueous composition an anti-seep agent comprising on a weight basis 95 to 99.8 percent of a water insoluble petroleum hydrocarbon boiling within the range of 300 to 630° F., a non-ionic emulsifying agent, .1 to 2.0 percent, wherein said emulsifying agent is the reaction product of tall oil and ethylene oxide and methyl polysiloxane having a viscosity of 100 centistokes at 25° C., .1 to 3.0 percent in an amount corresponding from about 1 to 3 parts of said anti-seep agent per 100 parts of said aqueous composition.

6. The method of imparting anti-seepage properties to an aqueous ethylene glycol composition which comprises incorporating in said aqueous composition an anti-seep agent comprising on a weight basis 95 to 99.8 percent of a water insoluble burner distillate, a non-ionic emulsifying agent wherein said non-ionic emulsifying agent is an ester of a polyhydroxy alcohol with a higher fatty acid, .1 to 2.0 percent, and a liquid organic silicon compound, .1 to 3.0 percent, of the general formula:

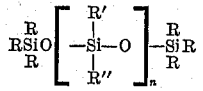

in which R, R', and R" represent alkyl, aryl, and alkoxy radicals and $n$ represents zero and positive integers and wherein said organic silicon compound is soluble in said burner distillate and insoluble in water in an amount corresponding from about 1 to 3 parts of said anti-seep agent per 100 parts of said aqueous composition.

7. The method of imparting anti-seepage properties to an aqueous ethylene glycol composition which comprises incorporating in said aqueous composition an anti-seep agent comprising on a weight basis 95 to 99.8 percent of a water insoluble light cycle oil, a non-ionic emulsifying agent wherein said non-ionic emulsifying agent is an ester of a polyhydroxy alcohol with a higher fatty acid, .1 to 2.0 percent, and a liquid organic silicon compound, .1 to 3.0 percent, of the general formula:

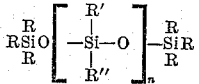

in which R, R', and R" represent alkyl, aryl, and alkoxy radicals and $n$ represents zero and positive integers and wherein said organic silicon compound is soluble in said light cycle oil and insoluble in water in an amount corresponding from about 1 to 3 parts of said anti-seep agent per 100 parts of said aqueous composition.

8. The method of imparting anti-seepage properties to an aqueous ethylene glycol composition which comprises incorporating in said aqueous composition an anti-seep agent, comprising on a weight basis 95 to 99.8 percent of a water insoluble petroleum hydrocarbon boiling within the range of 300 to 630° F.; a non-ionic emulsifying agent wherein said non-ionic emulsifying agent is an ester of a polyhydroxy alcohol with a higher fatty acid, .1 to 2.0 percent; and a liquid organic silicon compound, .1 to 3.0 percent of the general formula:

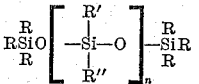

in which R, R', and R" represent alkyl, aryl, and alkoxy radicals and $n$ represents zero and positive integers and wherein said organic silicon compound is soluble in said petroleum hydrocarbon and insoluble in water in an amount corresponding from about 1 part of said anti-seep agent per 100 parts of said aqueous composition.

References Cited in the file of this patent

UNITED STATES PATENTS

| | | |
|---|---|---|
| 2,467,177 | Zimmer | Apr. 12, 1949 |
| 2,693,451 | Heisig | Nov. 2, 1954 |
| 2,716,611 | Paxton | Aug. 30, 1955 |

FOREIGN PATENTS

| | | |
|---|---|---|
| 384,089 | Great Britain | Dec. 1, 1932 |